United States Patent [19]

Donofrio

[11] Patent Number: 4,576,079
[45] Date of Patent: Mar. 18, 1986

[54] GLASS SCRIBER ASSEMBLY

[76] Inventor: Pat Donofrio, 1725 Westfield, Trenton, Mich. 48183

[21] Appl. No.: 677,689

[22] Filed: Dec. 3, 1984

[51] Int. Cl.⁴ ................................................ C03B 33/02
[52] U.S. Cl. ........................................ 83/886; 83/563; 83/648; 83/881; 33/32.6
[58] Field of Search ................ 83/886, 648, 881, 563; 33/32 E; 30/164.95

[56] References Cited

U.S. PATENT DOCUMENTS

| | | | |
|---|---|---|---|
| 3,577,636 | 5/1971 | DeTorre | 83/886 X |
| 4,104,939 | 8/1978 | Bonaddio | 83/886 X |
| 4,120,220 | 10/1978 | Mullen | |
| 4,222,300 | 9/1980 | El-Habr | |
| 4,275,633 | 6/1981 | Littlehorn, Jr. | |
| 4,291,824 | 9/1981 | DeTorre | 83/886 X |
| 4,437,376 | 3/1984 | Flint | 83/881 X |
| 4,494,444 | 1/1985 | Masse | 83/886 |

Primary Examiner—Donald R. Schran
Attorney, Agent, or Firm—Gifford, Groh, VanOphem, Sheridan, Sprinkle & Dolgorukov

[57] ABSTRACT

The present invention provides a glass scriber assembly having a base, a support attached to the base and wherein the support includes an upper surface adapted to support a pane of glass. An elongated arm is pivotally mounted to the base so that one end of the arm is positioned over the support surface. A conventional glass scriber is detachably secured to the end of the arm so that the scriber engages a pane of glass on the support surface. Simultaneously, a compression spring in between the other end of the arm and the base urges the scriber against the glass pane. A roller is rotatably mounted to the support and abuts against the bottom of the glass pane on the support surface so that, upon manually rotating the roller, the roller moves the glass pane under the glass scriber.

10 Claims, 3 Drawing Figures

GLASS SCRIBER ASSEMBLY

BACKGROUND OF THE INVENTION

I. Field of the Invention

The present invention relates to a glass scriber assembly for cutting glass.

II. Description of the Prior Art

In many types of applications, such as ornamental glass designs, it is desirable to cut small pieces of glass in intricate shapes. Typically, the glass is scribed with a hand held cutter in order to obtain the desired shape.

One disadvantage of using a hand held cutter, however, is that it is difficult to manually outline the desired shape on the glass thus oftentimes necessitating extensive grinding of the glass in order to obtain the desired finmal shape after the glass is cut. Furthermore, it is difficult to manually maintain an even pressure on the glass when using a manual scribe thus difficult to obtain an even scribe.

One previously known, device, however, utilizes a spring loaded scribe in conjunction with a manually rotated roller. The sheet of glass is positioned in between the scribe and the roller so that, by rotating the roller, the of glass pane moves underneath the glass scribe in order to form the desired shape.

One disadvantage with this previously knwon device, however, is that the glass must be supported by hand during the scribing operation. This is not only dangerous but also results in non-uniform scribing. A still further disadvantage of this previously known device is that a special glass scriber must be used which is not only expensive but also difficult to replace.

SUMMARY OF THE PRESENT INVENTION

The present invention provides a glass scriber assembly which overcomes all of the above mentioned disadvantages of the previously known devices.

In brief, the glass scriber assembly of the present invention comprises an elongated base having a support attached adjacent one end. The support includes an upper planar surface in which a pane of glass is positioned and supported.

An elongated arm is pivotally mounted at a midpoint to the base so that one end of the arm is positioned above the support surface. A throughbore is formed through this end of the arm which slidably receives a conventional manual glass scriber and a locking tube assembly detachably secures the scriber to the arm. With the scriber attached to the arm, the glass scriber engages a sheet or pane of glass which is positioned on the support surface. A compression spring is sandwiched in between the other end of the arm and the base an urges the glass scriber resiliently against the glass pane.

A roller is rotatably mounted to the support and is positioned within an opening formed in the support surface so that the roller frictionally engages the glass pane on the support surface. An elongated axle is secured to the roller and has a knob at its other end for manually rotating the roller and thus moving the sheet of glass along the support surface. Simultaneously, the sheet of glass can be manually shifted in order to obtain the desired glass shape.

BRIEF DESCRIPTION OF THE DRAWING

A better understanding of the present invention will be had upon reference to the following detailed description, when read in conjunction with the accompanying drawing wherein like reference characters refer to like parts throughout the several views and in which.

DETAILED DESCRIPTION OF A PREFERRED EMBODIMENT OF THE INVENTION

Figure 1:
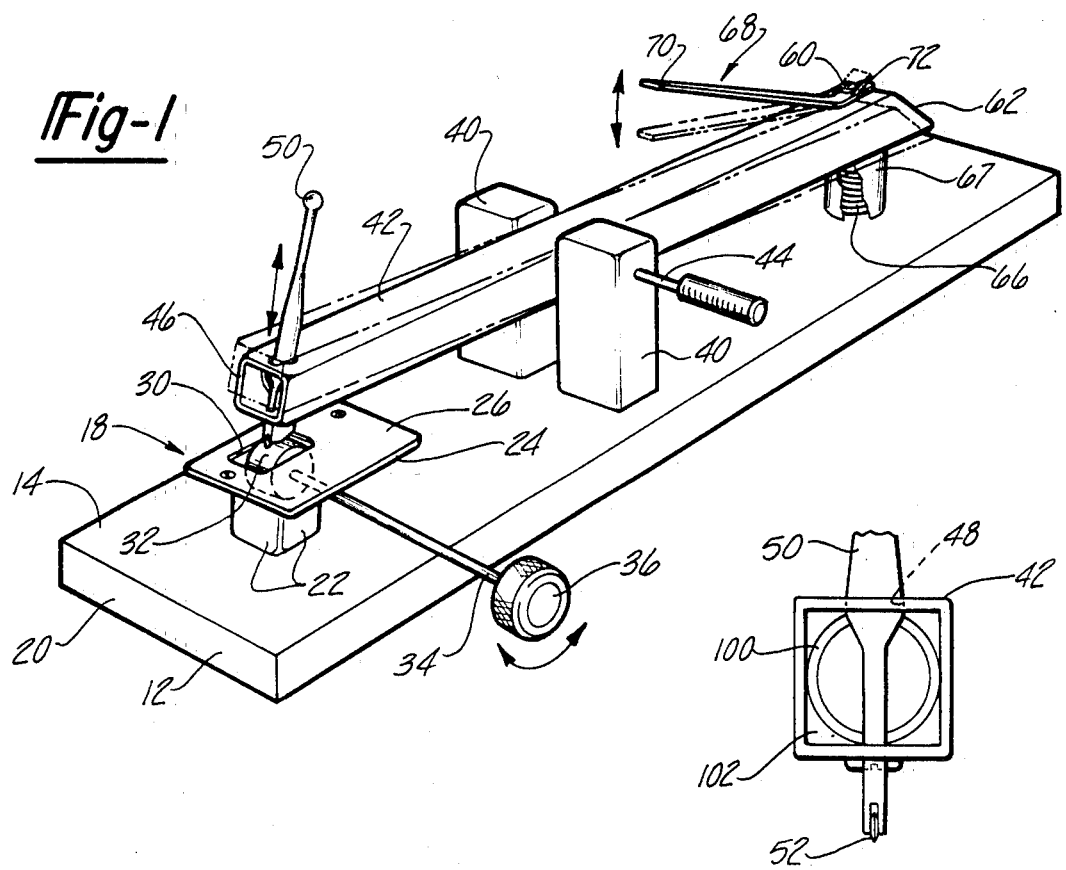
FIG. 1 is a perspective view illustrating a preferred embodiment of the present invention.
Figure 2:
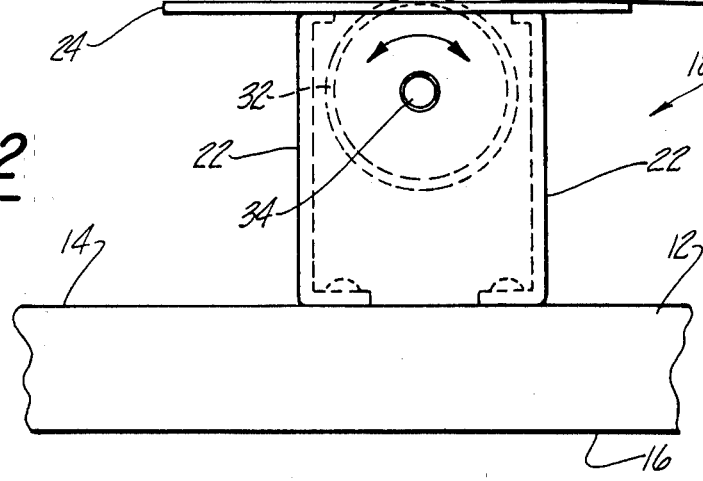
FIG. 2 is a fragmentary partial sectional view illustrating a portion of the preferred embodiment of the invention.

With reference to FIGS. 1 and 2, a preferred embodiment of the glass scriber assembly of the present invention is thereshown and comprises an elongated and generally rectangular base 12 having an upper surface 14 and a lower surface 16. Both surfaces 14 and 16 are generally planar so that the bottom surface 16 of the base 12 can flatly rest upon a workbench (not shown) or the like.

A support 18 is attached to the upper surface 14 of the base 12 adjacent one end 20. The support 18 includes four sides 22 which extend perpendicularly upwardly from the top surface 14 of the base 12 while a top 24 is positioned on top of and secured to the support sides 22. The top 24 includes an upper planar surface 26 which is generally parallel to, but spaced upwardly from, the base top surface 14 and is adapted to support a sheet or pane 28 (FIG. 2) of glass or the like.

A generally rectantular opening 30 (FIG. 1) is formed through the support top 24. A cylindrical roller 32 is secured to an elongated axle 34 which in turn is rotatably mounted to two sides 22 of the support 18 so that the top of the roller 32 is substantially flush with the top surface 26 of the supports 18 as best seen in FIG. 2. A knob 36 (FIG. 1) is secured to the free end of the elongated axle 34 so that, upon rotation of the roller 32 by the knob 36, the roller 32 moves the sheet 28 of glass along the support surface 26.

Referring now to FIG. 1, a pair of spaced apart and parallel pivot blocks 40 are secured to a midpoint and extend upwardly from the upper surface 14 of the base 12. A midpoint of an elongated arm 42 is pivotally secured in between the pivot blocks 40 by a pivot pin 44 so that the elongated arm 42 pivots about a substantially horizontal axis as shown in phantom line in FIG. 1. Furthermore, with the elongated arm 42 pivotally secured to the pivot blocks 40 one end 46 of the arm 42 is positioned above the opening 30 on the support surface 26. Preferably, the arm 42 is constructed from square metal tubing.

As best shown in FIG. 2, a throughbore 48 is formed through the arm 42 adjacent the end 46 so that the throughbore is open to and obliquely intersects the opening 30 on the support surface 26. This throughbore 48 corresponds in shape and is adapted to slidably receive a conventional hand glass scriber 50 having notches 51 so that the scribe end 52 of the scriber 50 engages the glass sheet 28 positioned on the support surface 26.

Figure 3:
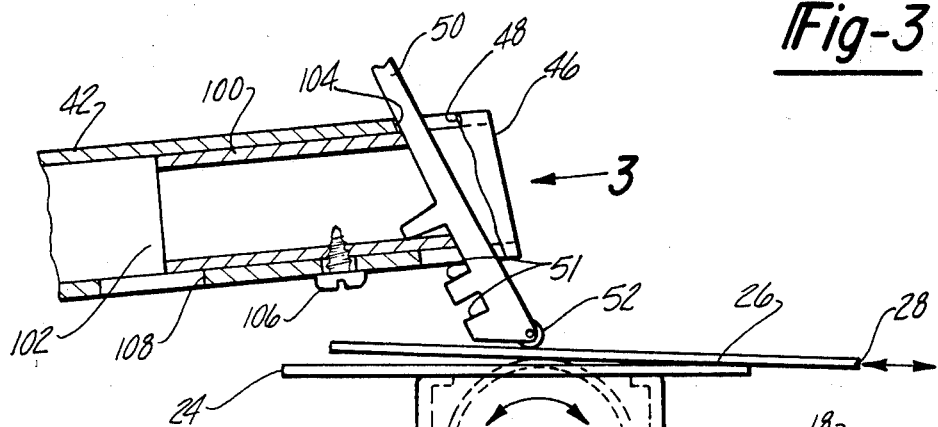
FIG. 3 is a view taken along arrow 3 in FIG. 2 and with parts removed for clarity.

With reference now to FIGS. 2 and 3, in order to detachably secure the scriber 50 to the arm 42, a locking tube 100 is longitudinally slidably mounted within the interior 102 of the arm 42. One end 104 of the tube 100 is angled at the same angle as the arm throughbore 48 so that, with the tube 100 slid towards the arm end 46, the tube 100 abuts against the scriber 50 at two longitudinally spaced positions therealong. Furthermore, the tube 100 extends into one notch 51 on the scriber thus locking the scriber 50 against longitudinal while the slot 48, since it corresponds to the shape of the scriber 50, prevents lateral movement. A screw 106 secures the arm 42 and locking tube 100 together while a slot 108 in the arms 42 facilitates manipulation of the tube 100.

Referring to FIG. 1, an elongated threaded fastener 60 slidably extends through the other end 62 of the arm 42 and threadably engages the base 12. A compression spring 66, preferably having a cover 67, extends around the fastener 60 and is sandwiched in a state of compression between the arm end 62 and the base 12. Consequenty, the compression spring 66 urges the scriber end 52 against the glass sheet 28 positioned on the support surface 26. Furthermore, the spacing between the scriber end 52 and the support surface 26 can be adjusted by adjusting the fastener 60 in order to accommodate glass sheets 28 having different widths.

In order to move the scriber end 52 out of engagement with the glass sheet 28, a lever 68 having two legs 70 and 72 which obliquely intersect each other are provided. The fastener 60 slidably extends through one leg 72 of the lever 68 so that the leg 72 abuts against the top of the arm 42 adjacent its end 62. Consequently, upon depression of the other lever leg 70, the lever 68 forces the end 62 of the arm 42 downwardly thus lifting the opposite end 46 of the arm 42 out of engagement with the glass sheet 28 as shown in phantom line.

In operation, the lever leg 70 is first depressed thus lifting the scriber end 52 upwardly and allowing the glass sheet 28 to be positioned between the scriber end 52 and the support surface 26. The lever 68 is then released so that the compression spring 66 forces the scriber end 52 against the glass sheet 28 at the desired position. Simultaneously, the support top 24 supports the glass sheet 28 against wobbling.

The roller 32 is then rotatably driven by its knob 26 thus moving the glass sheet 28 under the scriber end 52 along the desired break line. Since the support top 28 supports the glass sheet 28, the person cutting the glass sheet 28 can rotatably drive the roller 32 via the knob 36 with one hand while guiding the glass sheet 28 with his other hand. After the glass sheet 28 has been scribed as desired, the lever 68 is again depressed, the glass sheet 28 removed and the glass sheet 28 is then broken along the scribed line in the conventional fashion.

A primary advantage of the glass scriber assembly of the present invention is that it can be inexpensively constructed and yet is totally effective in use. Furthermore, since the assembly utilizes conventional hand scribers 50, the hand scriber 50 can be easily removed and replaced with a new or different type of scriber, for example an oil filled scriber, as required.

A still further advantage of the present invention is the provision of the fastener 60 which can be adjusted, as desired, not only to adjust the spacing in between the scriber end 52 and the glass sheet 28 but also to vary the compression of the helical spring 66. Thus, the force which the scriber end 52 exerts against the glass sheet 28 an be adjusted as desired.

Having described my invention, however, many modifications thereto will become apparent to those skilled in the art to which it pertains without deviation from the spirit of the invention as defined by the scope of the appended claims.

I claim:

1. A glass scriber assembly comprising:
   a base,
   a support attached to said base, said support having a surface adapted to support a sheet of glass,
   an elongated arm,
   means for pivotally mounting a midpoint of said arm to said base so that one end of said arm is positioned over said support surface,
   a conventional glass scriber,
   means for detachably securing said glass scriber to said one end of said arm so that said glass scriber engages a sheet of glass on said support surface,
   means for resiliently urging the other end of said arm away from said base,
   means for moving a sheet of glass on said support surface, and
   wherein said arm includes a throughbore at said one end, said throughbore being open to said surface and adapted to slidably receive said conventional glass scriber and corresponding in shape to said conventional scriber, and wherein said detachable securing means comprises a locking tube slidably mounted in said arm and adapted to flatly abut against said scriber at longitudinally spaced positions, and means for detachably securing said tube and said arm together.

2. The invention as described in claim 1 and comprising means for pivoting said arm against said resilient urging means.

3. The invention as defined in claim 1 wherein said resilient urging means comprises a compression spring sandwiched between said base and the other end of said arm.

4. The invention as defined in claim 3 and comprising means for adjusting the distance between said base and said other end of said arm.

5. The invention as defined in claim 4 wherein said adjusting means comprises a threaded fastener slidably extending through said arm and threadably engaging said base.

6. The invention as defined in claim 5 and comprising a said lever having two legs which obliquely intersect, and means for attaching one leg of said lever to said fastener so that said one leg abuts against said arm.

7. The invention as defined in claim 1 wherein said support surface has an opening, and wherein said moving means comprises a roller rotatably mounted to said support so that said roller protrudes slightly above said surface, and means for rotatably driving said roller.

8. The invention as defined in claim 7 wherein said rotatably driving means comprises an elongated axle secured at one end to said roller, and a knob at the other end of said axle for manually rotating said roller.

9. The invention as defined in claim 1 wherein said scriber includes a notch and wherein a portion of said tube is positioned in said notch to prevent longitudinal movement of said scriber.

10. The invention as defined in claim 9 wherein the axis of said throughbore is oblique with respect to said support surface.

* * * * *